United States Patent

Imanari et al.

[11] Patent Number: 6,101,837
[45] Date of Patent: Aug. 15, 2000

[54] ICE THERMAL STORAGE TYPE AIR-CONDITIONER AND ICE THERMAL STORAGE TANK

[75] Inventors: Masao Imanari, Ibaraki-ken; Toshihiko Fukushima; Toshio Hatada, both of Tsuchiura; Katsumi Matsubara, Ushiku; Naoto Katsumata, Shimizu, all of Japan

[73] Assignee: Hitachi, Ltd., Tokyo, Japan

[21] Appl. No.: 09/264,871

[22] Filed: Mar. 9, 1999

[30] Foreign Application Priority Data

Mar. 13, 1998 [JP] Japan ................................. 10-062522

[51] Int. Cl.$^7$ ................................................. F25D 17/02
[52] U.S. Cl. ................................................. 62/434; 62/59
[58] Field of Search ................................. 62/434, 430, 59; 165/10

[56] References Cited

U.S. PATENT DOCUMENTS

| | | | |
|---|---|---|---|
| 3,653,221 | 4/1972 | Angus | 62/59 |
| 4,116,651 | 9/1978 | Rickert | 62/59 |
| 4,656,836 | 4/1987 | Gilbertson | 62/185 |
| 4,827,735 | 5/1989 | Foley | 62/430 |
| 4,831,831 | 5/1989 | Carter et al. | 62/59 |
| 5,054,298 | 10/1991 | MacCracken | 62/434 |
| 5,239,839 | 8/1993 | James | 62/434 |
| 5,272,887 | 12/1993 | Zendzian, Sr. | 62/295 |
| 5,524,453 | 6/1996 | James | 62/434 |
| 5,944,089 | 8/1999 | Roland | 165/10 |

FOREIGN PATENT DOCUMENTS 5-296642   11/1993   Japan ....................................... 62/430

*Primary Examiner*—Henry Bennett
*Assistant Examiner*—Melvin Jones
*Attorney, Agent, or Firm*—Anotnelli, Terry, Stout & Kraus, LLP

[57] ABSTRACT

An ice thermal storage type air-conditioner and an ice thermal storage tank, in which unused portions in the ice thermal storage tank is reduced to enhance an ice filling rate in the ice thermal storage tank or to prevent excessive icing from damaging a heat transfer unit. An ice thermal storage type air-conditioner in which heat exchangers are installed in the ice thermal storage tank 1, the heat exchangers having a heightwise size extending from a bottom of the ice thermal storage tank 1 to near a top of a container, and comprising a plurality of flat-shaped plate-type heat transfer units 14 arranged therein in layered manner in a thicknesswise direction

11 Claims, 11 Drawing Sheets

ICE THERMAL STORAGE TYPE AIR-CONDITIONER AND ICE THERMAL STORAGE TANK

BACKGROUND OF THE INVENTION

The present invention relates to an ice thermal storage type air-conditioner in which ice is made or thawed by flowing a cooling medium in the interior of a heat transfer unit or units provided in an ice thermal storage tank, and an ice thermal storage tank used therein.

Ice making methods in ice thermal storage type air-conditioners include two kinds of static method and dynamic method. With the static method, icing forms and grows ice on a surface of a heat transfer unit or units provided in a thermal storage tank, so that there is caused a problem that heat transfer resistance increases with an increase in the thickness of ice and so ice making decreases in efficiency. With the dynamic method, a cooling medium of low temperature and low pressure is made to flow in the interior of a heat transfer unit or units provided on the bottom of an ice thermal storage tank to make ice, and then a cooling medium of high temperature and high pressure is made to flow to peel ice, which has grown, off the surface of the heat transfer unit so that ice pieces are permitted to come up to the upper portion of the thermal storage tank by their buoyancy and cold accumulates as ice in the thermal storage tank. An example of the dynamic method disclosed in Japanese Patent Laid-open Publication No. 42878/1996 is known.

In the prior art of the above publication, a solution is presented with respect to suppression of an increase in thermal resistance accompanied by the formation of ice and to enhancement of an ice filling rate for a volume of water in the tank. Since a plate evaporator is provided as the heat transfer unit on the bottom of the ice thermal storage tank, however, there is raised a problem that the ice filling rate for a container space in the ice thermal storage tank (the rate of occupation) decreases. Besides, because of peeling ice off the heat transfer unit, which will become an evaporator at certain periods in operation, there is raised a problem that the surrounding water is warmed.

It is an object of the present invention to provide an ice thermal storage type air-conditioner in which unused portions not contributing to ice making in an ice thermal storage tank are reduced to improve the ice filling rate of the ice thermal storage tank or to prevent a heat transfer unit from being damaged due to excessive icing, and an ice thermal storage tank used therein.

SUMMARY OF THE INVENTION

The present invention provides an ice thermal storage type air-conditioner including heat exchangers installed in an ice thermal storage tank, the heat exchangers comprising a plurality of flat plate-type heat transfer units which have a heightwise size extending from a bottom of said ice thermal storage tank to near a top of a container of said ice thermal storage tank, and are arranged in layered manner in-a thicknesswise direction thereof.

With such arrangement, the heat transfer units of flat plate-type serving as an evaporator have substantially a size substantially corresponding to a height of a container of the ice thermal storage tank, and are disposed in layered manner in a thicknesswise direction in the ice thermal storage tank to eliminate gaps being not usable for ice making as unused portions in the ice thermal storage tank, so that the ice filling rate can be enhanced.

The present invention also provides an ice thermal storage type air-conditioner including an ice thermal storage tank which contains therein water substantially to a height of a container thereof, and heat exchangers arranged in said ice thermal storage tank, the air-conditioner comprising a plurality of flat plate-type heat transfer units arranged in layered manner in a thicknesswise direction thereof in the ice thermal storage tank to permit icing to form and grow ice on surfaces of the plate-type heat transfer units.

Thus, the heat transfer units serving as an evaporator at the time of ice making are of flat plate-type to be disposed in layered manner in a thicknesswise direction thereof, and ice is made to grow on the surfaces of the respective heat transfer units, so that ice formed is not increased in thickness, despite of ice making by the static method, more than required, and heat transfer resistance can be made small. Gaps being not usable for ice making as unused portions are eliminated, so that the ice filling rate can be enhanced.

The present invention also provides an ice thermal storage type air-conditioner including an ice thermal storage tank which contains therein water substantially to a height of a container thereof, and heat exchangers arranged in the ice thermal storage tank, the air-conditioner comprising 20 to 60 plate-type heat transfer units having a thickness of 3 to 10 mm and provided in layered manner in a thicknesswise direction thereof at intervals of 10 to 50 mm in the ice thermal storage tank, and wherein icing forms and grows ice on surfaces of the plate-type heat transfer units.

Thus, for example, with a cylindrical-shaped ice thermal storage tank, gaps being not usable for ice making as unused portions are reduced to enable enhancing the ice filling rate to the extent of 87% while being around 65% in the prior art.

The present invention further provides an ice thermal storage type air-conditioner including an ice thermal storage tank which contains therein water substantially to a height of a container thereof, and a heat exchanger provided in the ice thermal storage tank and permitting a cooling medium to flow therein, the air-conditioner comprising a plurality of flat plate-type heat transfer units arranged in layered manner in a thicknesswise direction thereof in the ice thermal storage tank, and wherein at the time of ice making the cooling medium inflows at lower portions of the plate-type heat transfer units and outflows at upper portions of the units.

Thus, the cooling medium inflows at the lower portions of the flat plate-type heat transfer units, so that ice making begins at the lower portions of the plate-type heat transfer units and during an ice making process, the water is not confined but escapes to go to the upper portions of the units. Therefore, portions being not usable for ice making are eliminated to enhance the ice filling rate, and damages against the plate-type heat transfer units can be avoided, which a part of water confined would then freeze and expand to cause.

The present invention further provides an ice thermal storage type air-conditioner including an ice thermal storage tank which contains therein water substantially to a height of a container thereof, heat exchangers arranged in the ice thermal storage tank and comprising a plurality of flat plate-type heat transfer units arranged in layered manner in a thickness-wise direction thereof in the ice thermal storage tank, and header units connected to the plate-type heat transfer units and disposed outside the water.

Thus, gaps between the plate-type heat transfer units and the header units to constitute unused portions are located outside the water, so that the ice filling rate can be enhanced.

In one aspect of the present invention, a plurality of rectifying members are disposed in the plate-type heat transfer units so that flow passages for a cooling medium branch and merge in repeated manner. Thus, mixing of the cooling medium is made better to enable uniformizing ice formed in thickness.

In further aspect of the present invention, a plurality of partitions having holes are disposed in the plate-type heat transfer units. Thus, contact portions between the inner surfaces of the plate-type heat transfer unit and the partitions are reduced. And it is possible to reduce thermal resistance from outside the plate-type heat transfer unit to the cooling medium flowing inside the plate-type heat transfer unit and to make the thermal resistance uniform.

In still further aspect of the present invention, the plate-type heat transfer unit is constructed such that two plates are joined together to form flow passages therebetween. Thus, the number of parts can be reduced.

In still further aspect of the present invention, the plate-type heat transfer unit is constructed such that two plates are joined together to form flow passages therebetween, and irregular rectifying members having different angles of inclination are disposed in the plate-type heat transfer unit. Thus, the number of parts is reduced, the cooling medium can be promoted to branch and flow together, and pressure loss in the plate-type heat transfer unit can be made small.

The present invention further provides an ice thermal storage tank in which-heat exchangers are installed, the heat exchangers comprising a plurality of flat plate-type heat transfer units which have a heightwise size extending from a bottom of said ice thermal storage tank to near a top of a container of the tank, and are arranged in layered manner in a thicknesswise direction.

The present invention further provides an ice thermal storage tank in which heat exchangers are installed to permit a cooling medium to flow therein, the tank comprising a plurality of flat plate-type heat transfer units arranged therein in layered manner in a thicknesswise direction thereof, and in which the cooling medium inflows at lower portions of the plate-type heat transfer units and outflows at upper portions of the units.

DETAILED DESCRIPTION OF THE PREFERRED EMBODIMENTS

Figure 14:
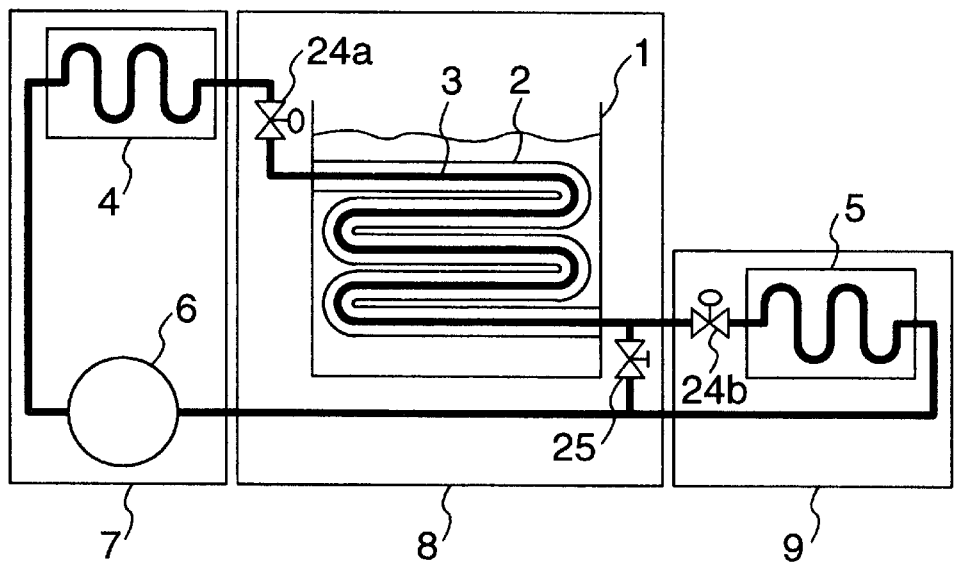
FIG. 14 is a view showing a basic construction of an ice thermal storage type air-conditioner.

As shown in FIG. 14, an ice thermal storage type air-conditioner comprises an outdoor unit 7, in which a compressor 6, an outdoor heat exchanger 4 and the like are put together, a thermal storage unit 8, in which an ice thermal storage tank 1, branched piping and the like are put together, and an indoor unit 9 including an indoor heat exchanger 5. The refrigeration cycle is executed mainly at night by the use of midnight electric power so as to store in the ice thermal storage tank 1 cold in the form of ice, and the cold is utilized for air-conditioning in daytime. When cold is to be stored in the ice thermal storage tank 1, a heat transfer pipe (heat transfer unit) 3 in the ice thermal storage tank 1 is made to serve as an evaporator in the refrigeration cycle so as to make ice on its surface to store cold.

In the refrigeration cycle, a cooling medium of high temperature and high pressure from the compressor 6 passes through the outdoor heat exchanger 4, which acts as a condenser, an expansion valve 24a, which is controlled in opening degree, the heat transfer pipe 3, which acts as an evaporator in the thermal storage tank 1, and a valve 25, and then returns to the compressor 6. The expansion valve 24a is fully closed.

When stored cold is to be utilized for air-conditioning, the heat exchanger in the thermal storage tank 1 is used as a part of the condenser in the refrigeration cycle, so that a cooling medium of high temperature and high pressure is made to flow in the heat exchanger and ice 2 is thawed from the ice making surface of the heat transfer pipe 3 to provide cold. The refrigeration cycle is executed in order of the compressor 6, the outdoor heat exchanger 4, which acts as condensers, the thermal storage tank 1, the expansion valve 24a, and the indoor heat exchanger 5, which acts as an evaporator (the valve 25 is fully closed).

Figure 15:
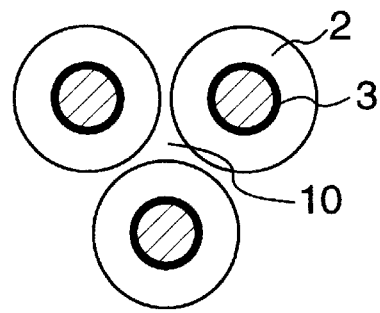
FIG. 15 is a cross-sectional view of heat transfer pipes of the prior art when ice making.

Conventionally, the heat transfer pipe 3 used for ice making in the ice thermal storage tank 1 comprises a copper pipe (having an outside diameter of about 7 to 9 mm) having a circular cross-section and bent in zigzag manner. As a result, ice formed on the surface of the copper pipe is tubular in shape to have a substantially circular cross-section as shown in FIG. 15, and there are created unused potions 10 between ice bodies 2 formed on adjacent heat transfer pipe (copper pipe) 3 portions in vertical and lateral directions. In this manner, an ice filling rate (a ratio of an ice volume to a total water volume filled) is at most around 65%.

To increase the ice filling rate of ice existing in the thermal storage tank 1 to 65%, ice 2 having a thickness of 60 to 70 mm must be formed on the surface of the heat transfer pipe 3 and the thermal resistance over an extent from the heat transfer surface to the formed surface of ice increases with the formation of ice 2, so that it takes a long time until ice making is completed.

Further, when ice is made in excess of a predetermined amount, ice bodies 2 having grown on adjacent heat transfer pipe 3 portions confine water in the unused portion 10 to cut off the same from escape, resulting in a possibility that the water in the unused portion 10 then freezes and expands to cause breakage on the heat transfer pipe 3.

Figure 1:
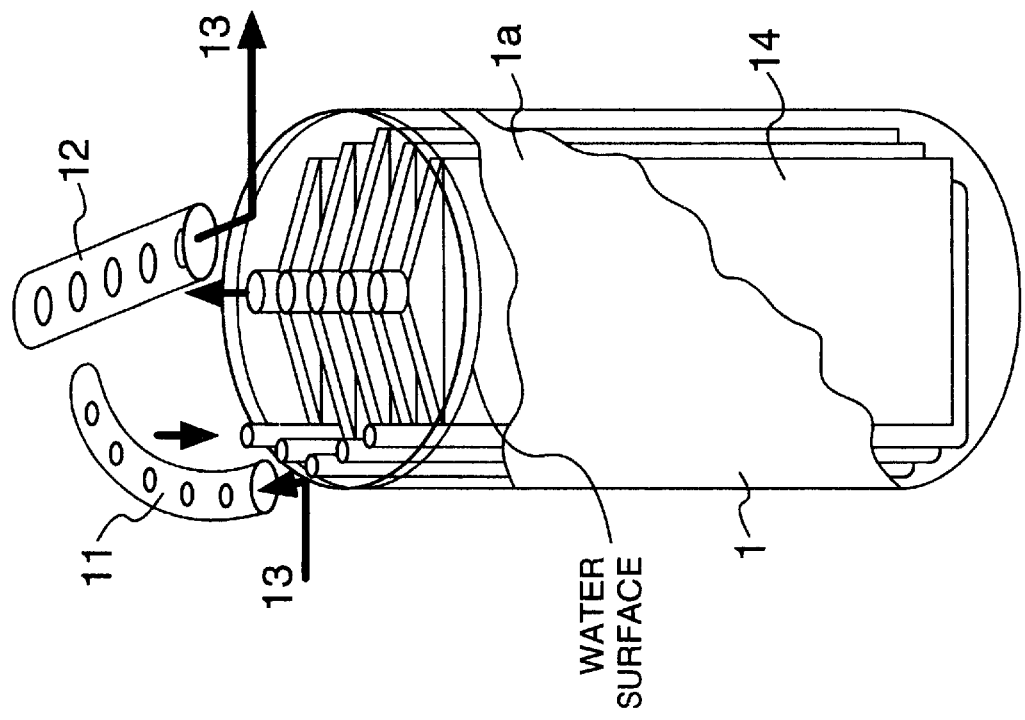
FIG. 1 is a view showing a construction of an ice thermal storage tank according to an embodiment of the invention.

In FIG. 1, the cylindrical-shape ice thermal storage tank 1a is constructed such that a plurality of vertical plate-type heat transfer units 14 are packed vertically in the tank to be layered in thicknesswise direction thereof to be submerged in the tank. With the arrangement, formation of unused portions 10 between the adjacent heat transfer units 14 and those gaps around a cooling medium inlet side header 11 and an outlet side header 12, which are unusable for ice making, can be avoided to improve the ice filling rate. For instance, for a cylindrical thermal storage tank ($\Phi$1100×1775) filled with water of 1.520 $m^3$, a heat transfer unit in the form of a copper pipe (pipe diameter of $\Phi$8, and total length of 208 m) having a circular cross-section provides an amount of ice of 0.988 $m^3$ attached thereto with an ice filling rate of about 65%. For a cylindrical ice thermal storage tank of the same size charged with 43 sheets of 5 mm-thick plate-type heat transfer units 14, which are packed in layered manner in their thickness directions at pitch of 25 mm, the ice filling rate can be increased to 87%. With a thermal storage tank having a rectangular cross-section, plate-type heat transfer units 14 can be arranged with less gaps therebetween to further increase the ice filling rate.

As shown in FIG. 1, the cooling medium inlet side header 11 and the cooling medium outlet side header 12 are disposed above the plate-type heat transfer units 14, so that the plate-type heat transfer units 14 suffice to be inserted from above the cylindrical thermal storage tank 1a to enable improving a manufacturing quality.

Because the inlet side header 11 is not submerged in the water, it is possible to prevent ice from being unevenly formed on the inlet side header 11 to cause damage to the heat transfer pipe. Further, in the case of a heat transfer pipe having a circular cross-section, ice formed around the pipe will also have a circular cross-section to provide an increased rate in thermal resistance with the progress of thermal storage. The use of such plate-type heat transfer units 14 shown in FIG. 1, however, makes thermal resistance proportional to the thickness of ice formed to enable shortening a period of time required for the thermal storage.

In the ice thermal storage tank, while a cooling medium having flowed in the lower portions of the plate-type heat transfer units 14 flows upward during ice making, water between the plate-type heat transfer units 14 and the cylindrical ice thermal storage tank a is deprived of heat by the cooling medium 13 to evaporate, so that there is presented a vapor-liquid two-phase flow state, in which dryness varies in a heightwise direction of the plate-type heat transfer units 14. In view of this, it is desirable that rectifying members presenting a small pressure loss be provided within the plate-type heat transfer units 14 to provide a better mixing of the cooling medium in a widthwise direction of the plate-type heat transfer units 14 to uniformize ice formed in thickness.

It is desirable to use a non-azeotrope cooling medium typified by HFC407C as a cooling medium in the present ice thermal storage type air-conditioner, the non-azeotrope cooling medium having a feature that its evaporation temperature rises as the evaporation proceeds. In that case, while the cooling medium inflows at the lower portions of the plate-type heat transfer units 14 to go upward, the more an amount of ice formed at the lower portions of the plate-type heat transfer units 14, the less the amount at the upper portions of the units because the evaporation temperature of the cooling medium rises as the evaporation proceeds. Thus, during the ice making process, water between the plate-type heat transfer units 14 is not confined but escapes to go to the upper portions of the units, so that damage, which water would be confined to cause to the heat transfer units, is avoided.

Figure 2:
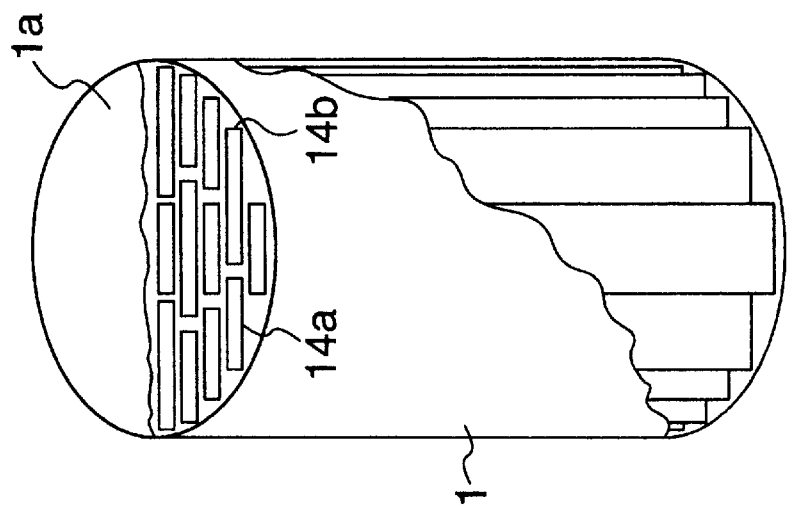
FIG. 2 is a view showing a construction of an ice thermal storage tank according to a further embodiment of the invention.

Referring to FIG. 2, a large number of plate-type eat transfer units 14 having a rectangular-shaped cross-section are packed vertically in a heightwise direction of the cylindrical thermal storage tank 1a to be submerged in the water in the tank. The width of every plate-type heat transfer units 14 is not conformed to the dimension at respective mount locations but two kinds of plate-type heat transfer units 14a and 14b having basic widths of a and b, respectively, are used in combination to fill the objective thermal storage tank 1a highly densely.

In this manner, common parts can be increased in number for cost reduction by not preparing plate-type heat transfer units 14 according to various thermal storage tanks but combining plate-type heat transfer units 14 having several kinds of basic widths to pack them highly densely.

Figure 3:
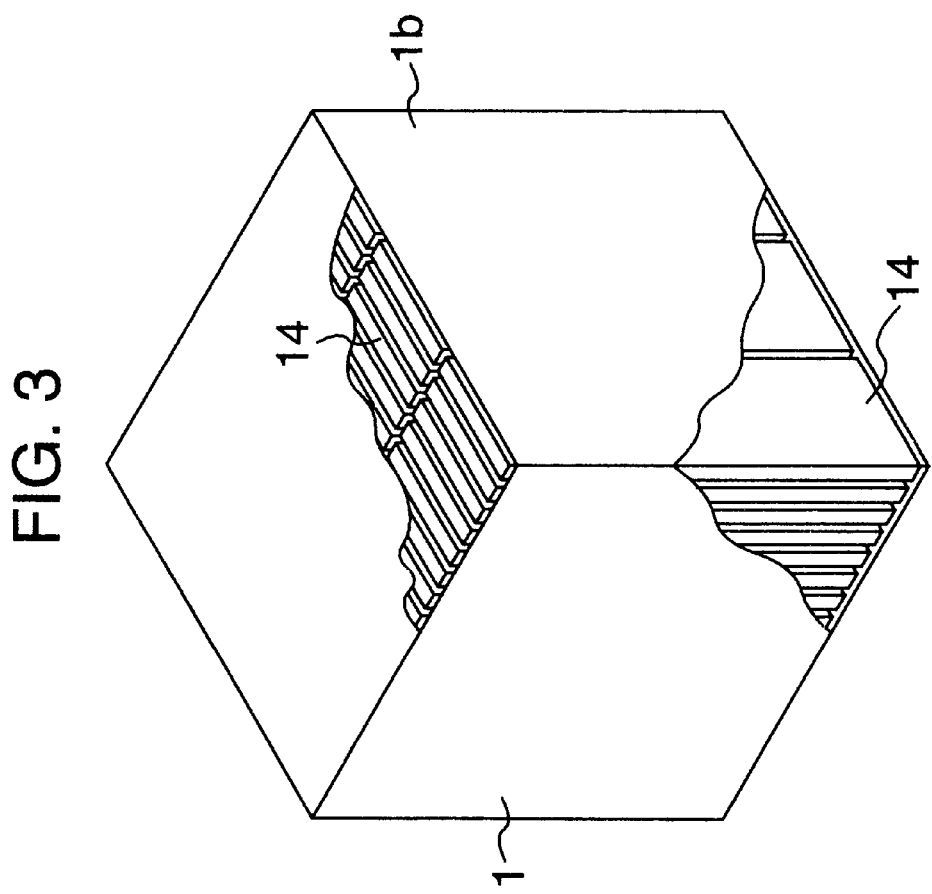
FIG. 3 is a view showing a construction of an ice thermal storage tank according to a still further embodiment of the invention.

Further, when the plate-type heat transfer units 14 are used in combination with a square-shaped thermal storage tank 1b as shown in FIG. 3, they can be packed in the tank with higher density than that with the case where a cylindrical thermal storage tank 1a is used, and so the ice filling rate is further enhanced. Moreover, since headers center on the upper portion of the tank, it is possible to enhance an existing thermal storage tank in ice filling rate by removing a group of conventional zigzag shaped heat transfer pipes from the existing thermal storage tank and instead charging the plate-type heat transfer units 14 in the tank from above.

Figure 4:
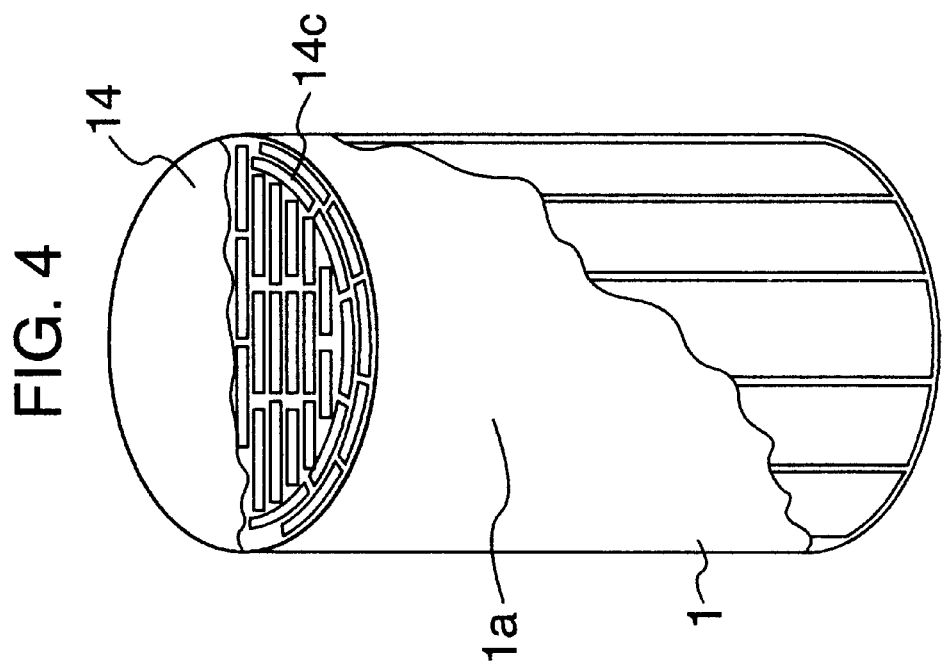
FIG. 4 is a view showing a construction of an ice thermal storage tank according to a further embodiment of the invention.

Referring to FIG. 4, not only plate-type heat transfer units 14 having a rectangular cross-section but also curved plate-type heat transfer units 14c are packed in combination in the cylindrical ice thermal storage tank 1a to be submerged in the water in the tank. Accordingly, a rate, at which ice occupies a space near the inner wall of the cylindrical ice thermal storage tank 1a, is enhanced to thereby enable enhancing the total ice filling rate.

Figure 5:
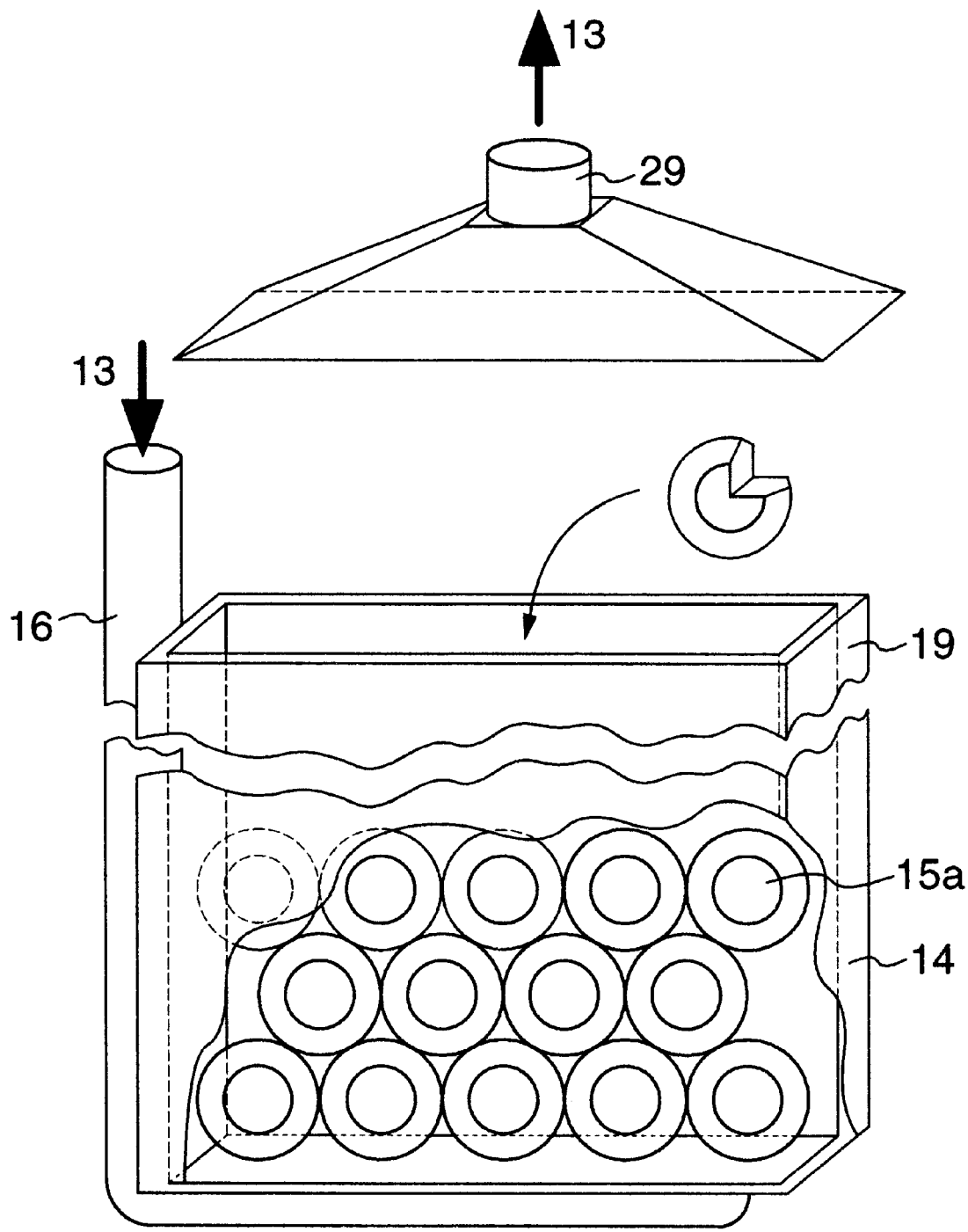
FIG. 5 is a view showing a plate-type heat transfer unit according to an embodiment of the invention.

A plate-type heat transfer unit 14 shown in FIG. 5 is constructed in the manner that a large number of disk-shaped rectifying members 15a are packed in a casing 19. Since both sides of the disk-shaped rectifying members 15a are chamfered at edges thereof, the chamfered portions of the rectifying members can ensure flow passages for the cooling medium 13 even if the rectifying members 15a are packed to contact with one another. Accordingly, mixing of the cooling medium 13 is made better to enabling uniformizing the thickness of ice formed. Also, productivity can be improved since the casing 19 of the plate-type heat transfer unit 14 and the rectifying members 15a are required not to be integral with each other or not to be fixed while being provided with gaps for flow passages 23 for the cooling medium.

Figure 6:
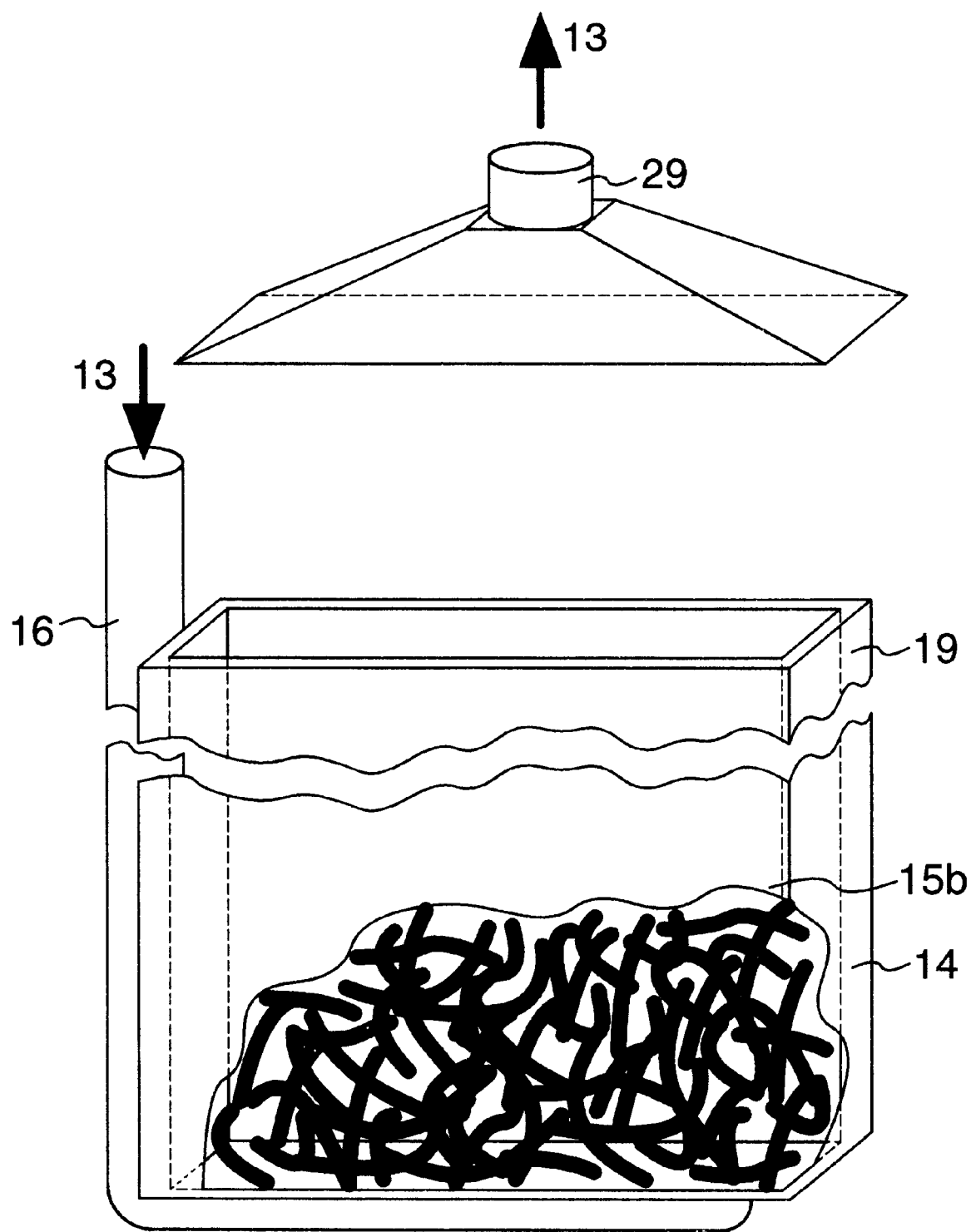
FIG. 6 is a view showing a plate-type heat transfer unit according to a further embodiment of the invention.

Referring to FIG. 6, a large number of cord-shaped rectifying members 15b are packed in the casing 19 of a plate-type heat transfer unit 14, and are varied in a packing rate to ensure flow passages 23 for the cooling medium according to the size of the casing 19. Further, varying the packing rate of the cord-shaped rectifying members 15b also in a heightwise direction of the plate-type heat transfer unit 14 can easily vary the sizes of the flow passages 23 for the cooling medium in accordance with the composition of the vapor-liquid two-phase flow.

Figure 7:
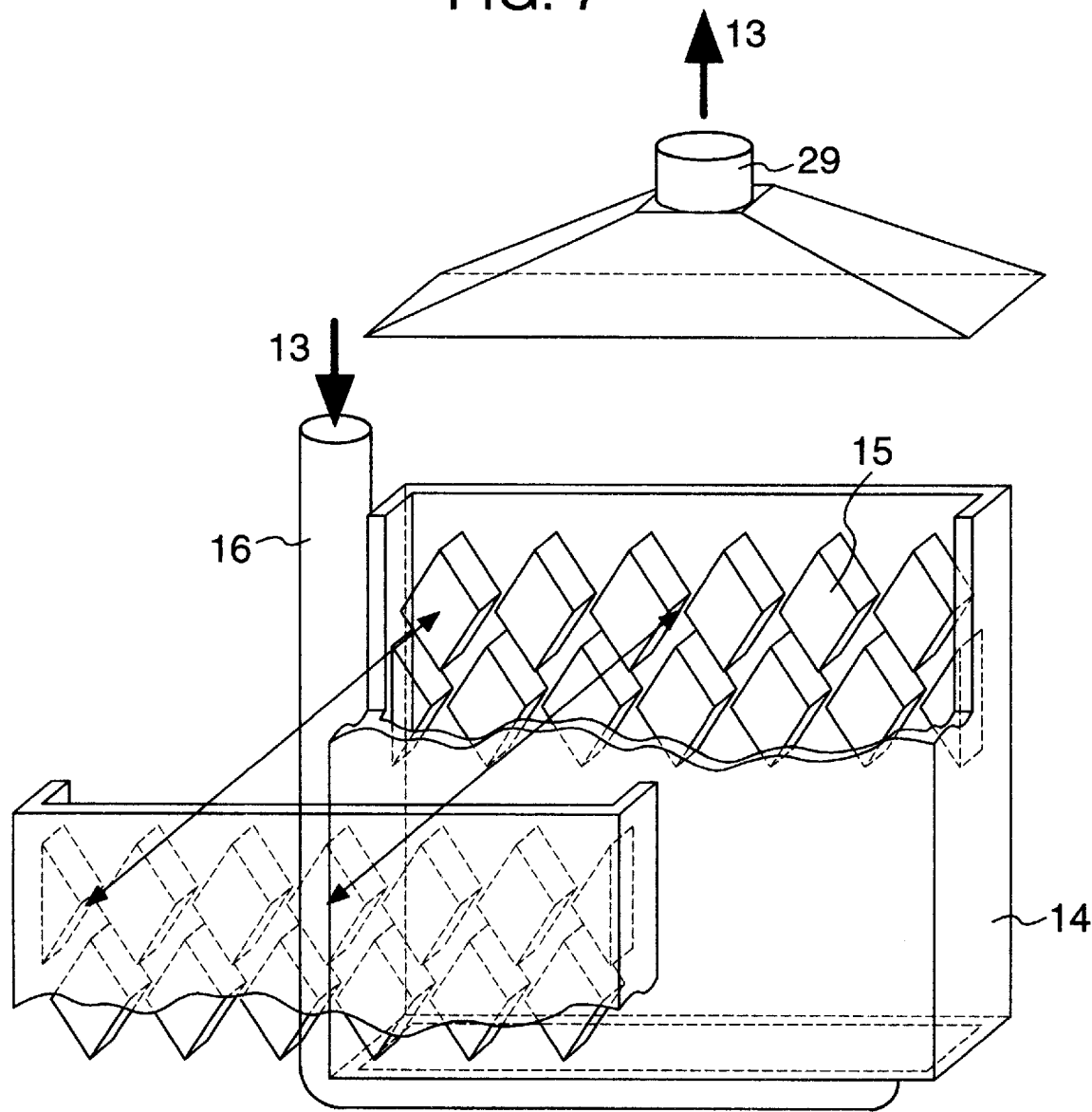
FIG. 7 is a view showing a plate-type heat transfer unit according to a still further embodiment of the invention.

Referring to FIG. 7, a large number of rhomb-shaped rectifying members 15 are provided inside both heat transfer surfaces of a plate-type heat transfer unit 14 to be shifted in mount positions so as not to overlap with one another. Although the cooling medium 13 is made to uniformly mix only in heightwise and widthwise directions of the plate-type heat transfer unit 14 in the arrangement shown in FIG. 5, uniform mixing of the cooling medium 13 can be made in the arrangement shown in FIG. 7 to uniformly mix in a thickness direction of the plate-type heat transfer unit 14 as well as in heightwise and widthwise directions of the plate-type heat transfer unit, so that it is possible to promote uniformity in vapor-liquid two-phase flow cooling medium.

Figure 8:
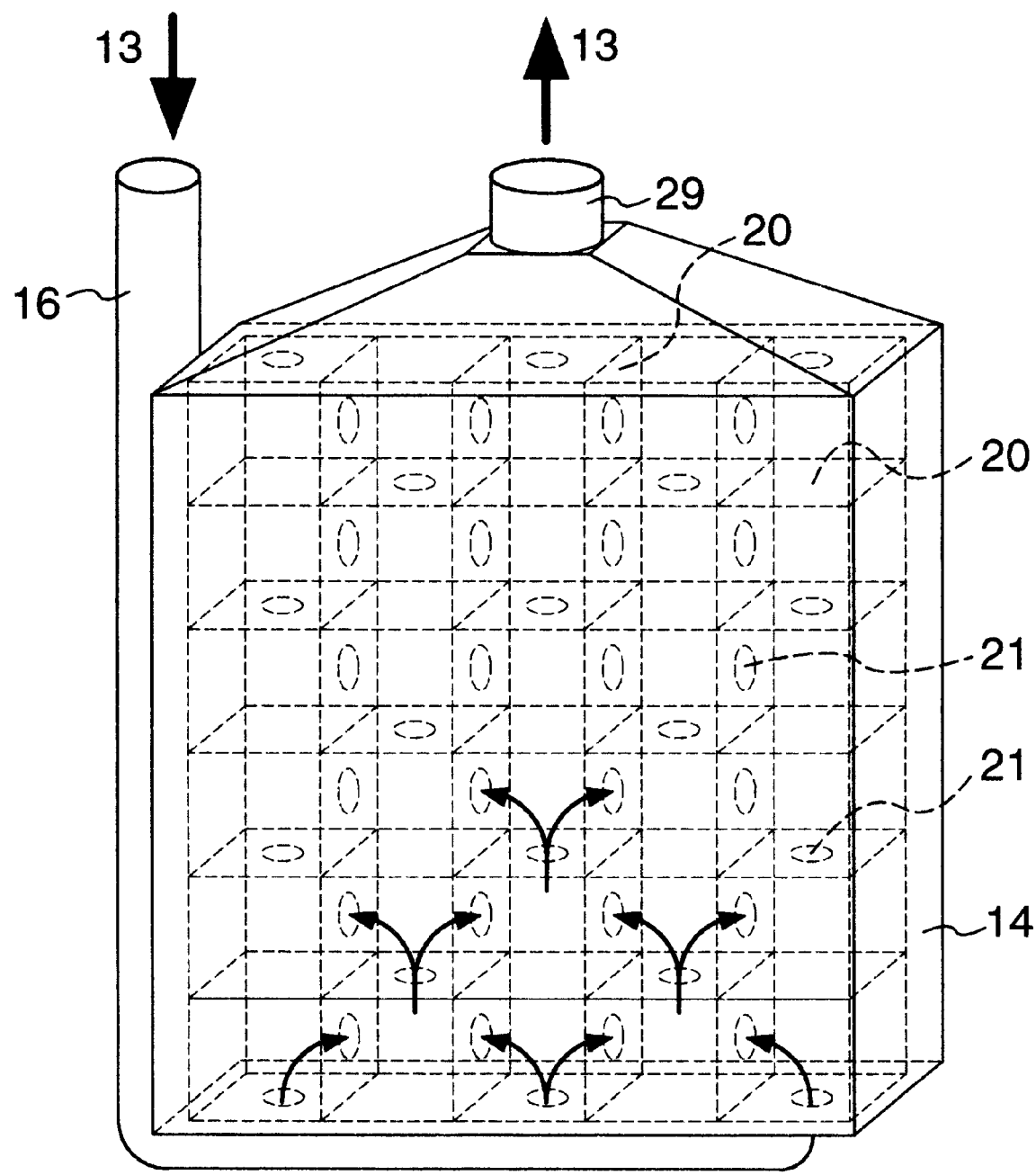
FIG. 8 is a view showing a plate-type heat transfer unit according to a further embodiment of the invention.

Referring to FIG. 8, a large number of partitions 20 each formed with holes 21 are provided in the casing 19 of the plate-type heat transfer unit 14 in heightwise and widthwise directions of the unit to constitute rectifying members 15 for forming flow passages 23 for the cooling medium. With the arrangement shown in FIG. 7, although contact portions between the casing 19 of the plate-type heat transfer unit 14 and the rectifying members 15 can be reduced as compared with those shown in FIG. 5, it is possible to reduce thermal resistance from the water outside the plate-type heat transfer unit 14 to the cooling medium 13 flowing inside the plate-type heat transfer unit 14, and to make the thermal resistance for the heat transfer surface more uniform.

Figure 9:
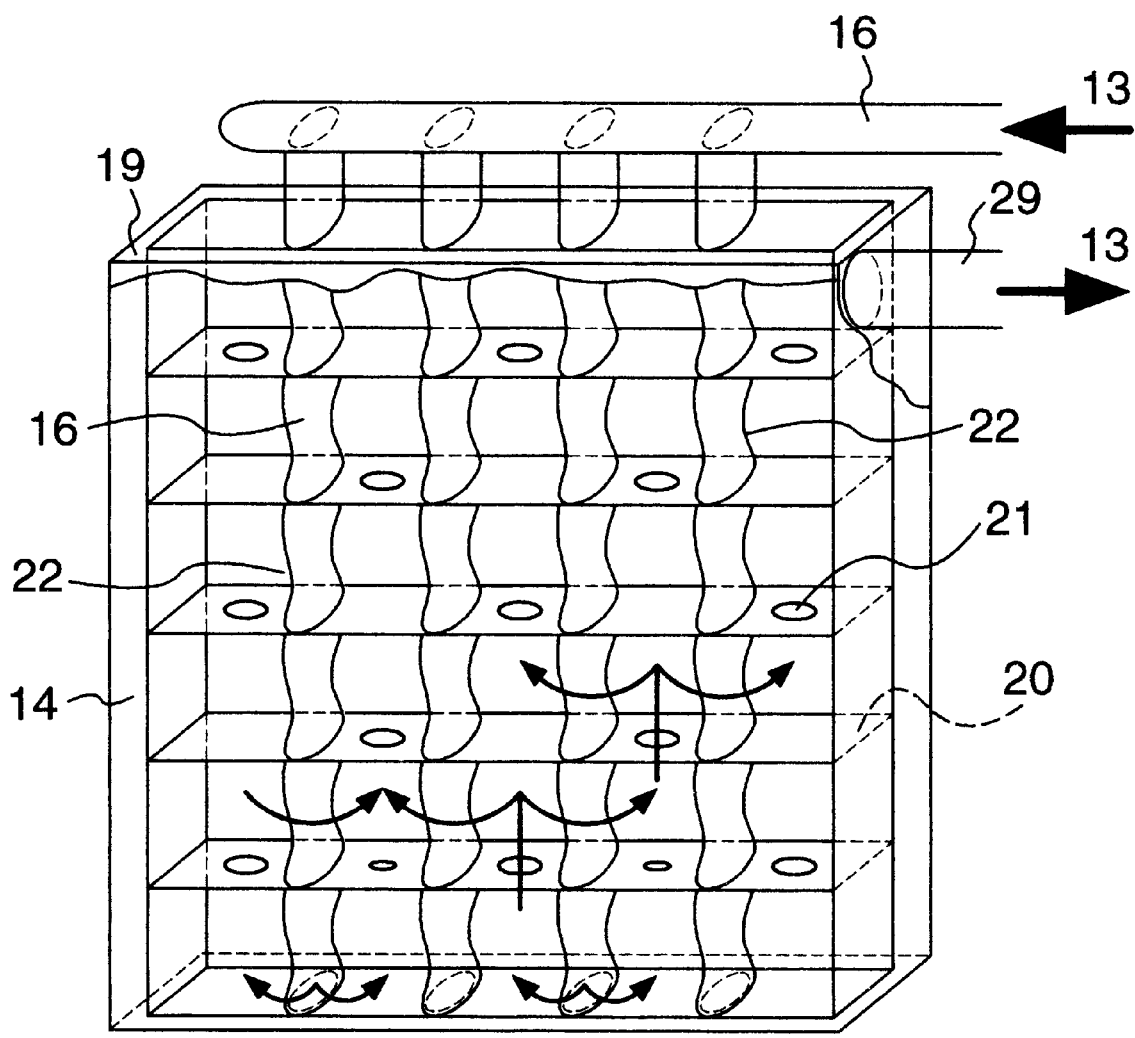
FIG. 9 is a view showing a plate-type heat transfer unit according to a still further embodiment of the invention.

Referring to FIG. 9, cooling medium inlet pipes 16 for introducing a cooling medium 13 into a plate-type heat transfer unit 14 are flattened in one direction (thicknesswise direction of the casing in the drawing) to make gaps between the pipes and the casing small, whereby the pipes serve as partitions 20 which function as rectifying members 15. Further, constricted portions 22 are provided partially on the respective cooling medium pipes 16 to enable serving as flow passages 23 for the cooling medium. Therefore, a process of joining the cooling medium pipes 16 to the outside of the plate-type heat transfer unit 14 can be omitted, and also substitution of the flattened cooling medium pipes 16 for parts of the partitions 20 can reduce the number of parts as compared with the arrangement shown in FIG. 8.

Figure 10:
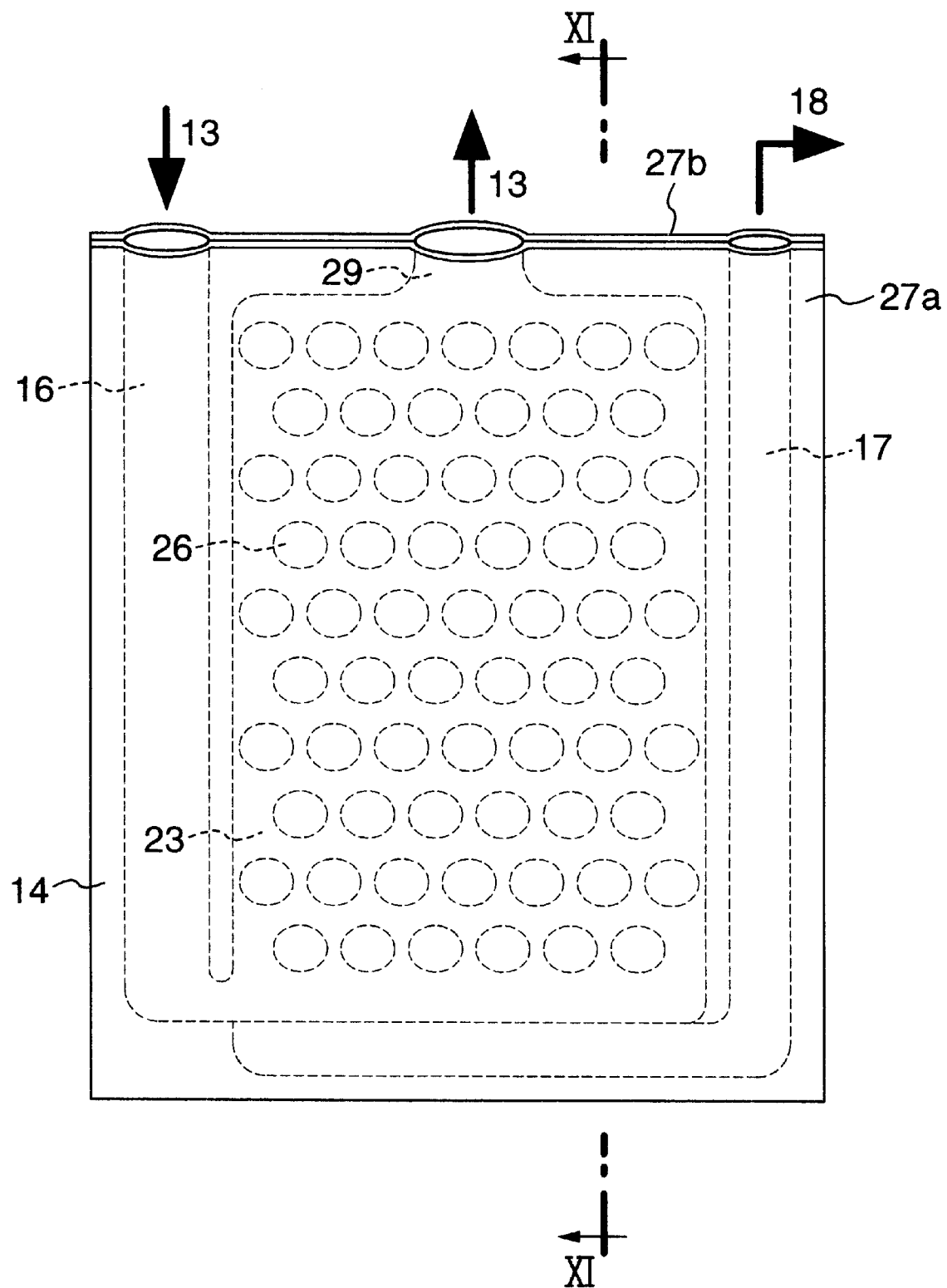
FIG. 10 is a view showing a plate-type heat transfer unit according to a further embodiment of the invention.
Figure 11:
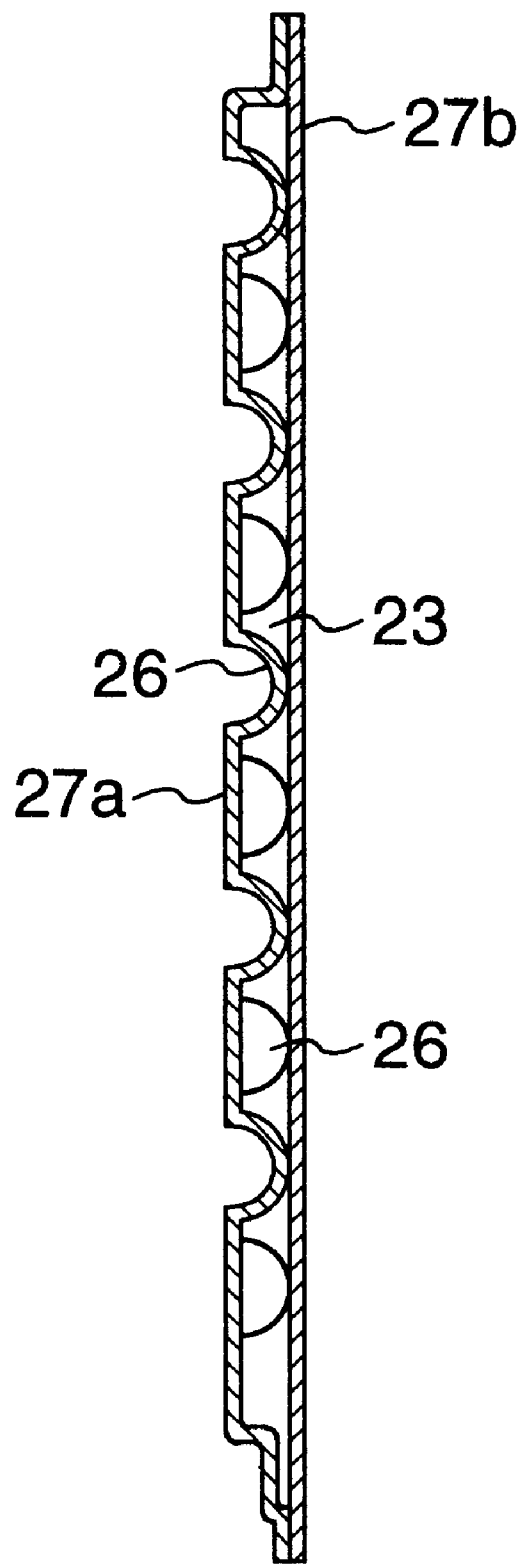
FIG. 11 is a cross-sectional view of the plate-type heat transfer unit taken along the line XI—XI in FIG. 10.

Referring to FIG. 10, plates 27a and 27b for formation of a heat transfer unit are joined together to form a cooling medium pipe 16 and cooling medium flow passages 23. One of the plates 27a is provided with a plurality of projections 26 which are extruded toward surfaces being joined. Therefore, the number of constituent parts can be considerably reduced, and a joining work, cutting work or the like for securing of the rectifying members, required in the arrangement shown in FIG. 7, can be omitted. Also, the plate thickness of the projections 26 can be made equal to that of the remaining portions of the plates, so that thermal resistance in the vicinities of the projections 26 can be prevented from increasing.

Preferably, an oil return pipe 17, which permits a lubricant 18 of a compressor 6, mixed in the cooling medium 13, to return to the compressor 6 again, is provided in the lower portion of the plate-type heat transfer unit 14 as desired. Since all of the cooling medium inlet pipe 16, plate-type heat transfer unit 14, cooling medium outlet pipe 28 and oil return pipe 17 are formed integrally by joining together, the plate-type heat transfer unit 14 and cooling medium inlet pipe 16 can dispense with joined portions or the like, of which corrosion can be prevented to improve the reliability.

Figure 12:
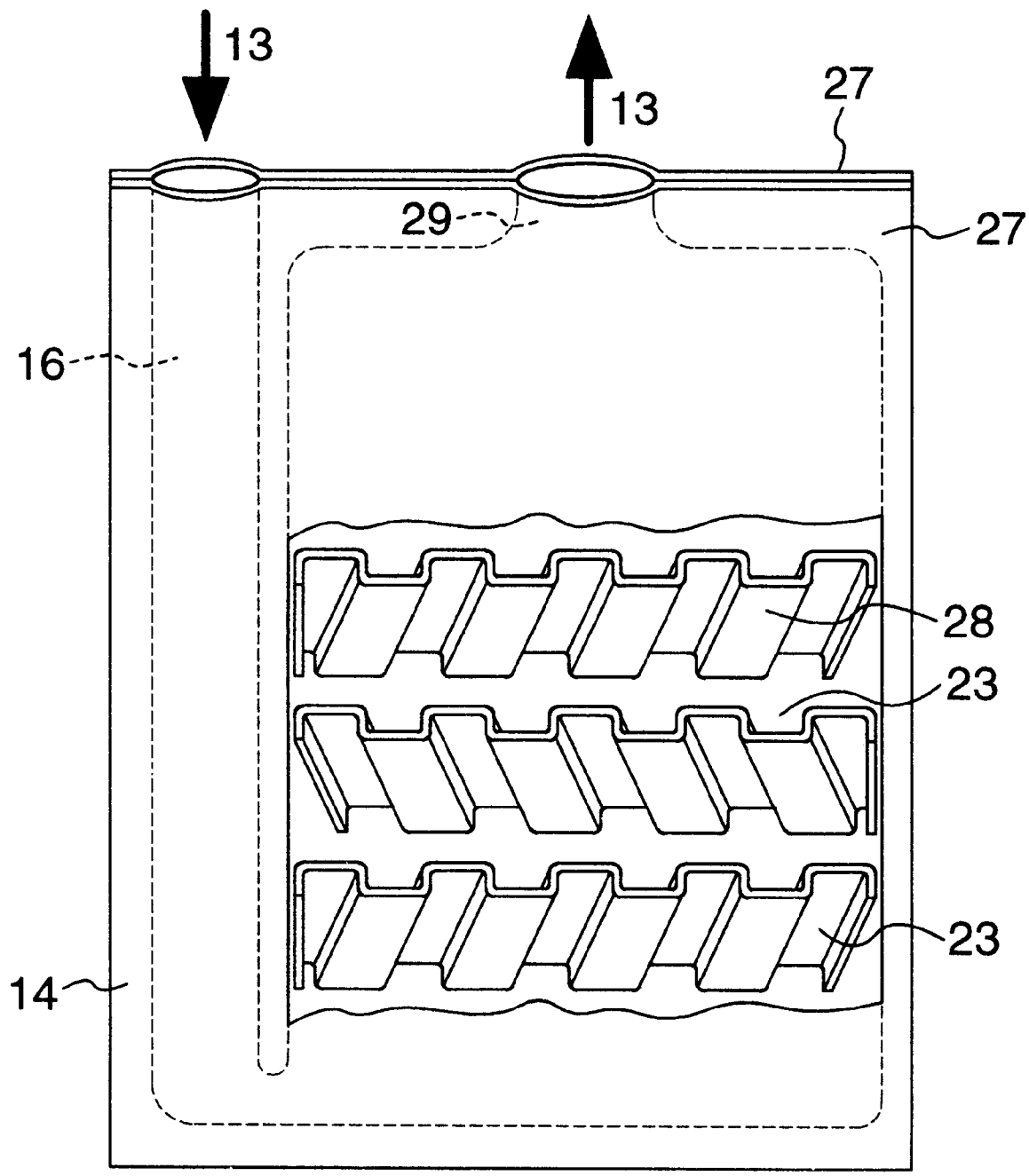
FIG. 12 is a view showing a plate-type heat transfer unit according to a still further embodiment of the invention.

Referring to FIG. 12, plates 27 for formation of a heat transfer unit are joined together to form a cooling medium inlet pipe 16 integrally with the plates 27, in the same manner shown in FIG. 10. In order to make a cooling medium 13 branch and flow together, irregular-shaped rectifying members 28 having different angles of inclination are fixed inside of the plates 27 to be arranged alternately in the flow direction of the cooling medium 13. The cooling medium 13 flows through tubular flow passages 23 (having rectangular cross-sections) for the cooling medium, the passages being defined by the irregularities of the rectifying members 28 and the inner walls of the plates 27.

Figure 13:
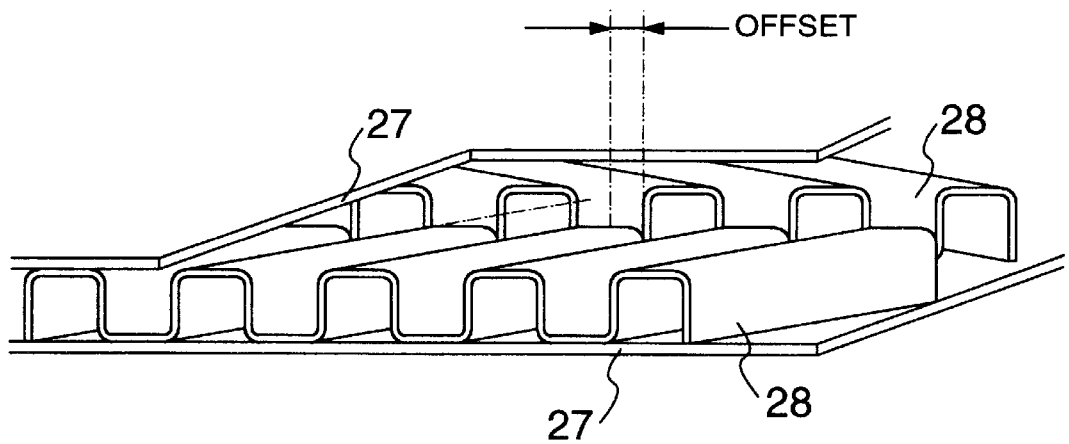
FIG. 13 is a perspective view showing the plate-type heat transfer unit shown in FIG. 12.

The irregular-shaped rectifying members 28 arranged successively alternately in the flow direction of the cooling medium 13 are disposed to be offset relative to one another as shown in FIG. 13. Accordingly, the cooling medium 13 can be made to branch and flow together when flowing from the irregular-shaped rectifying member 28 to the downstream rectifying member 28.

Further, provision of suitable gaps between the irregular-shaped rectifying members 28 makes it possible to promote branching and flowing-together of the cooling medium 13. Accordingly, the cooling medium 13 flowing along the irregular-shaped rectifying members 28 is rectified only in one direction at the respective stages, so that pressure loss between the plates 27 can be held down to a lower level than that in the arrangement shown in FIGS. 5 and 7. In addition, the irregular-shaped rectifying member 28 can be formed integrally for the respective stages to reduce the number of parts (or processes).

According to the present invention, the heat transfer units of flat plate-type serving as an evaporator at the time of ice making have substantially a size extending to near a top of a container of the ice thermal storage tank, and are disposed in layered manner in a thicknesswise direction in the ice thermal storage tank to eliminate gaps being not usable for ice making as unused portions in the ice thermal storage tank, so that an ice thermal storage type air-conditioner can be obtained in which the ice filling rate for the ice thermal storage tank can be enhanced.

Further, according to the present invention, the heat transfer units are of flat plate-type to be disposed in layered manner in a thicknesswise direction, and ice is made to grow on the surfaces of the respective heat transfer units, so that an ice thermal storage type air-conditioner can be obtained in which ice is not increased in thickness, despite of ice making by the static method, more than required, and the heat transfer resistance is made small.

Further, according to the present invention, 20 to 60 plate-type heat transfer units having a thickness of 3 to 10 mm are provided in layered manner in a thicknesswise direction thereof at intervals of 10 to 50 mm in the ice thermal storage tank, and icing forms and grows ice on surfaces of the plate-type heat transfer units, so that an ice thermal storage type air-conditioner can be obtained in which gaps being not usable for ice making as unused portions are reduced to enhance the ice filling rate to the extent of 87%.

Further, according to the present invention, a plurality of flat plate-type heat transfer units are arranged in layered manner in a thicknesswise direction thereof in the ice thermal storage tank, and the cooling medium inflows at the lower portions of the plate-type heat transfer units and outflows at the upper portions of the units, so that ice making begins at the lower portions of the plate-type heat transfer units and proceeds toward the upper portions of the units in a state that water is not confined. Therefore, an ice thermal storage type air-conditioner can be obtained for avoiding damages against the plate-type heat transfer units, which a part of water confined would then freeze and expand to cause.

Further, according to the present invention, a plurality of flat plate-type heat transfer units are arranged in layered manner in a thicknesswise direction thereof in the ice thermal storage tank, header units are disposed outside the water, and gaps between the plate-type heat transfer units and the header units are located outside the water, so that an ice thermal storage type air-conditioner can be obtained in which the ice filling rate is enhanced.

Further, according to the present invention, a plurality of flat plate-type heat transfer units having a heightwise size extending from a bottom of the ice thermal storage tank to near a top of a container of the tank are arranged in layered manner in a thicknesswise direction, so that an ice thermal storage tank can be obtained in which gaps being not usable for ice making as unused portions are eliminated to enhance the ice filling rate.

Further, according to the present invention, a plurality of flat plate-type heat transfer units are arranged in layered manner in a thicknesswise direction thereof, the cooling medium inflows at the lower portions of the plate-type heat transfer units and outflows at the upper portions of the units, ice making proceeds toward the upper portions of the plate-type heat transfer units in a state that water is not confined, so that an ice thermal storage tank can be obtained which is free from damages against the plate-type heat transfer units, which a part of water confined would then freeze and expand to cause.

What is claimed is:

1. In an ice thermal storage type air-conditioner including heat exchangers installed in an ice thermal storage tank, the improvement wherein said heat exchangers comprise a plurality of flat plate-type heat transfer units which have a heightwise size extending from a bottom of said ice thermal storage tank to near a top of a container of said ice thermal storage tank, and are arranged in layered manner in a thicknesswise direction thereof.

2. In an ice thermal storage type air-conditioner including an ice thermal storage tank which contains therein water substantially to a height of a container thereof, and heat exchangers arranged in said ice thermal storage tank, the improvement comprising a plurality of flat plate-type heat transfer units arranged in layered manner in a thicknesswise direction thereof in said ice thermal storage tank to permit icing to form and grow ice on surfaces of said plate-type heat transfer units.

3. In an ice thermal storage type air-conditioner including an ice thermal storage tank which contains therein water substantially to a height of a container thereof, and heat exchangers arranged in said ice thermal storage tank, the improvement comprising 20 to 60 plate-type heat transfer units having a thickness of 3 to 10 mm and provided in layered manner in a thicknesswise direction thereof at intervals of 10 to 50 mm in said ice thermal storage tank, and wherein icing forms and grows ice on surfaces of said plate-type heat transfer units.

4. In an ice thermal storage type air-conditioner including an ice thermal storage tank which contains therein water substantially to a height of a container thereof, and a heat exchanger provided in said ice thermal storage tank and permitting a cooling medium to flow therein, the improvement comprising a plurality of flat plate-type heat transfer units arranged in layered manner in a thicknesswise direction thereof in said ice thermal storage tank, and wherein at the time of ice making said cooling medium inflows at lower portions of said plate-type heat transfer units and outflows at upper portions thereof.

5. In an ice thermal storage type air-conditioner including an ice thermal storage tank which contains therein water substantially to a height of a container thereof, and heat exchangers arranged in said ice thermal storage tank, the improvement wherein said heat exchangers comprise a plurality of flat plate-type heat transfer units arranged in layered manner in a thicknesswise direction thereof in said ice thermal storage tank, and comprising header units connected to said plate-type heat transfer units and disposed outside said water.

6. An ice thermal storage type air-conditioner according to claim 1, further comprising a plurality of rectifying members disposed in said plate-type heat transfer units so that flow passages for a cooling medium branch and merge in repeated manner.

7. An ice thermal storage type air-conditioner according to claim 1, further comprising a plurality of partitions having holes and disposed in said plate-type heat transfer units.

8. An ice thermal storage type air-conditioner according to claim 1, wherein said plate-type heat transfer units are constructed such that two plates are joined together to form flow passages therebetween.

9. An ice thermal storage type air-conditioner according to claim 1, wherein said plate-type heat transfer units are constructed such that two plates are joined together to form flow passages therebetween, and a plurality of irregular rectifying members having different angles of inclination are disposed in said plate-type heat transfer units.

10. In an ice thermal storage tank in which heat exchangers are installed, the improvement wherein said heat exchangers comprise a plurality of flat plate-type heat transfer units which have a heightwise size extending from a bottom of said ice thermal storage tank to near a top of a container of the tank, and are arranged in layered manner in a thicknesswise direction.

11. In an ice thermal storage tank in which heat exchangers are installed to permit a cooling medium to flow therein, the improvement comprising a plurality of flat plate-type heat transfer units arranged therein in layered manner in a thicknesswise direction thereof, and wherein said cooling medium inflows at lower portions of said plate-type heat transfer units and outflows at upper portions of the units.

* * * * *